(12) United States Patent
Kim

(10) Patent No.: US 9,153,813 B2
(45) Date of Patent: Oct. 6, 2015

(54) SECONDARY BATTERY

(75) Inventor: Hoseong Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 916 days.

(21) Appl. No.: 12/646,966

(22) Filed: Dec. 23, 2009

(65) Prior Publication Data

US 2010/0167123 A1 Jul. 1, 2010

Related U.S. Application Data

(60) Provisional application No. 61/142,047, filed on Dec. 31, 2008.

(51) Int. Cl.
| H01M 2/30 | (2006.01) |
| H01M 2/02 | (2006.01) |
| H01M 10/04 | (2006.01) |
| H01M 10/0525 | (2010.01) |

(52) U.S. Cl.
CPC ............... *H01M 2/30* (2013.01); *H01M 2/021* (2013.01); *H01M 10/0431* (2013.01); *H01M 10/0525* (2013.01)

(58) Field of Classification Search
CPC ....................................... H01M 2/30
USPC ........................................ 429/211
See application file for complete search history.

(56) References Cited

U.S. PATENT DOCUMENTS

| 2006/0240319 A1 | 10/2006 | Chun |
| 2007/0166611 A1 * | 7/2007 | Oh et al. ............ 429/160 |
| 2008/0241676 A1 | 10/2008 | Naoi et al. |

FOREIGN PATENT DOCUMENTS

| EP | 1717894 A1 | 11/2006 |
| JP | 2000-077044 | 3/2000 |
| JP | 2001-243939 | 9/2001 |
| JP | 2003-109579 | * 4/2003 |
| JP | 2003-297304 | 10/2003 |
| JP | 2005-129393 | 5/2005 |
| JP | 2005-174691 | 6/2005 |
| JP | 2005-190885 | 7/2005 |
| JP | 2005-340005 | 12/2005 |
| JP | 2006-19075 | 1/2006 |
| JP | 2006-310283 | 11/2006 |
| JP | 2008-251464 | 10/2008 |
| KR | 1020050081520 A | 8/2005 |
| KR | 1020080034369 A | 4/2008 |

OTHER PUBLICATIONS

European Search Report dated Mar. 31, 2010 of the corresponding European Patent Application No. 09252926.2.
Japanese Office action dated Aug. 28, 2012 issued to corresponding Japanese Patent Application No. 2009-296188, 3 pages.

* cited by examiner

*Primary Examiner* — Jacob Marks
(74) *Attorney, Agent, or Firm* — Christie, Parker & Hale, LLP

(57) ABSTRACT

A secondary battery including a pouch; an electrode assembly in the pouch, the electrode assembly comprising a first electrode plate, a second electrode plate and a separator between the first electrode plate and the second electrode plate; and a first electrode tab and a second electrode tab extending from the electrode assembly, wherein a portion of at least one of the first electrode tab or the second electrode tab protruding from the pouch is non-planar along its length.

11 Claims, 12 Drawing Sheets

SECONDARY BATTERY

CROSS-REFERENCE TO RELATED APPLICATION

This application claims priority to and the benefit of provisional Patent Application No. 61/142,047 filed Dec. 31, 2008, the entire content of which is incorporated herein by reference.

BACKGROUND OF THE INVENTION

Lithium ion secondary batteries are classified into polygonal secondary batteries, cylindrical secondary batteries, and pouch secondary batteries according to their external structure.

In particular, a pouch secondary battery includes an electrode assembly and a pouch surrounding the electrode assembly, and is assembled as a battery pack by further including a protection circuit module and a case.

The present invention provides a secondary battery including an electrode tab that cannot be easily deformed by an external load, by forming a bending line or a protrusion in the electrode tab of the secondary battery and thereby increasing the rigidity of the electrode tab.

The present invention is not limited to the above-mentioned object, and those skilled in the art can clearly understand other unmentioned objects of the present invention.

According to the present invention, deformation of an electrode tab due to an external load and deviation of the electrode tab from a proper position can be prevented by bending the electrode tab in various shapes and thereby increasing the rigidity of the electrode tab.

Therefore, contact error can be prevented when the electrode tab makes contact with a pre-charger during a pre-charging operation of the secondary battery and welding error can be minimized between a terminal of a protection circuit module and the electrode tab when the electrode tab is welded to the protection circuit module.

Details of the following embodiments of the present invention are contained herein and in the accompanying drawings. The characteristics of the present invention and methods for achieving them will be apparent with reference to the embodiments of the present invention that will be described in detail with reference to the drawings. The same reference numerals are used throughout the specification to refer to the same or like elements.

Hereinafter, exemplary embodiments of the present invention will be described in detail with reference to the accompanying drawings. Although a pouch secondary battery is described in embodiments of the present invention, it is apparent that the spirit of the present invention is not limited thereto.

SUMMARY

A secondary battery is provided including a pouch; an electrode assembly in the pouch, the electrode assembly comprising a first electrode plate, a second electrode plate and a separator between the first electrode plate and the second electrode plate; and a first electrode tab and a second electrode tab extending from the electrode assembly, wherein a portion of at least one of the first electrode tab or the second electrode tab protruding from the pouch is non-planar along its length.

In one embodiment, at least one of the first electrode tab or the second electrode tab has at least one crease extending along its length, and further the crease may extend along an entire length of the portion of the electrode tab protruding from the pouch. In one embodiment, the portion of the electrode tap is substantially V-shaped, substantially W-shaped or substantially C-shaped. Additionally, a width of the first electrode tab and a width of the second electrode tab may be between about 2 mm and about 6 mm.

In one embodiment, a portion of both the first electrode tab and the second electrode tab protruding from the pouch is non-planar along its length and at least one of the first electrode tab or the second electrode tab may have at least one recessed portion, which may include a plurality of dimples. Further, the plurality of dimples may be located throughout a whole area of the portion of the at least one of the first electrode tab or the second electrode tab external to the pouch.

BRIEF DESCRIPTION OF THE DRAWINGS

The features and advantages of the present invention will be more apparent from the following detailed description in conjunction with the accompanying drawings, in which.

DETAILED DESCRIPTION OF THE EMBODIMENT

Figure 1:
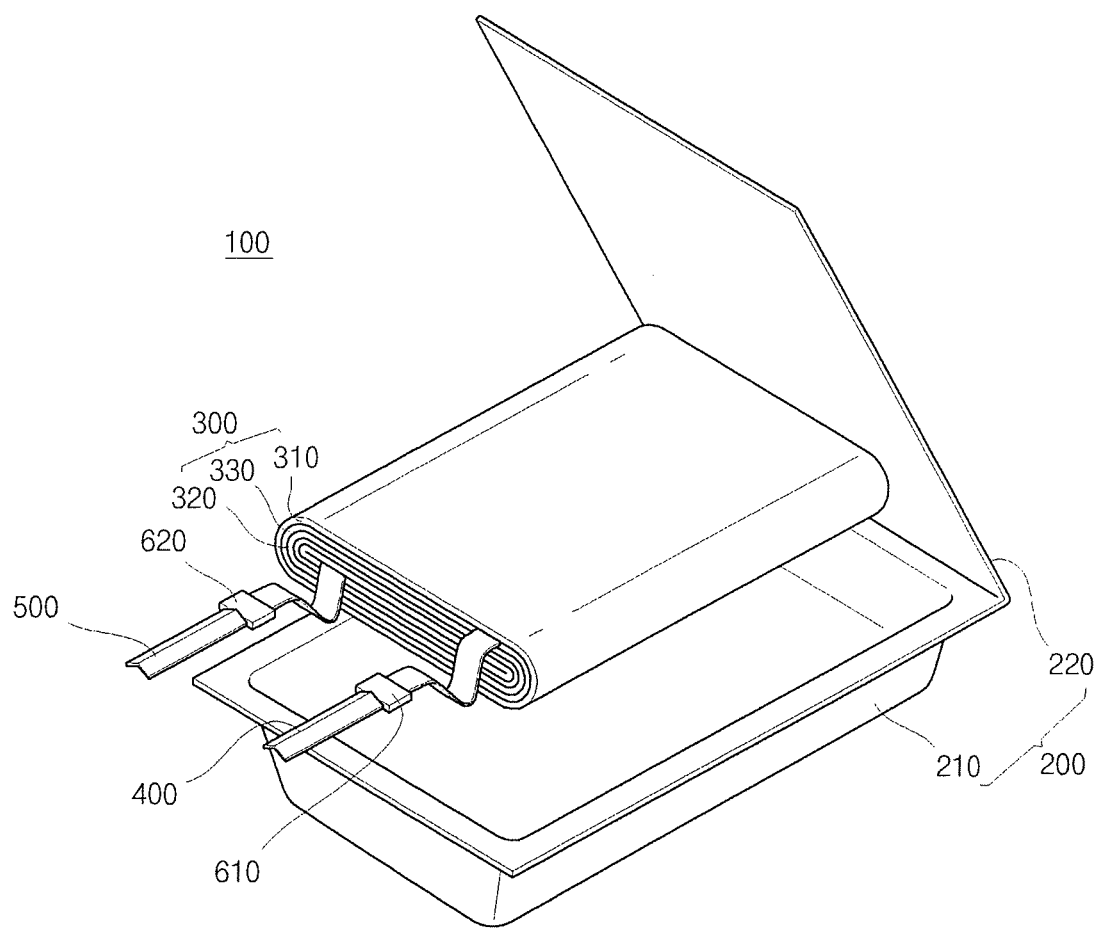
FIG. 1 is an exploded perspective view of a secondary battery according to an embodiment of the present invention.
Figure 2:
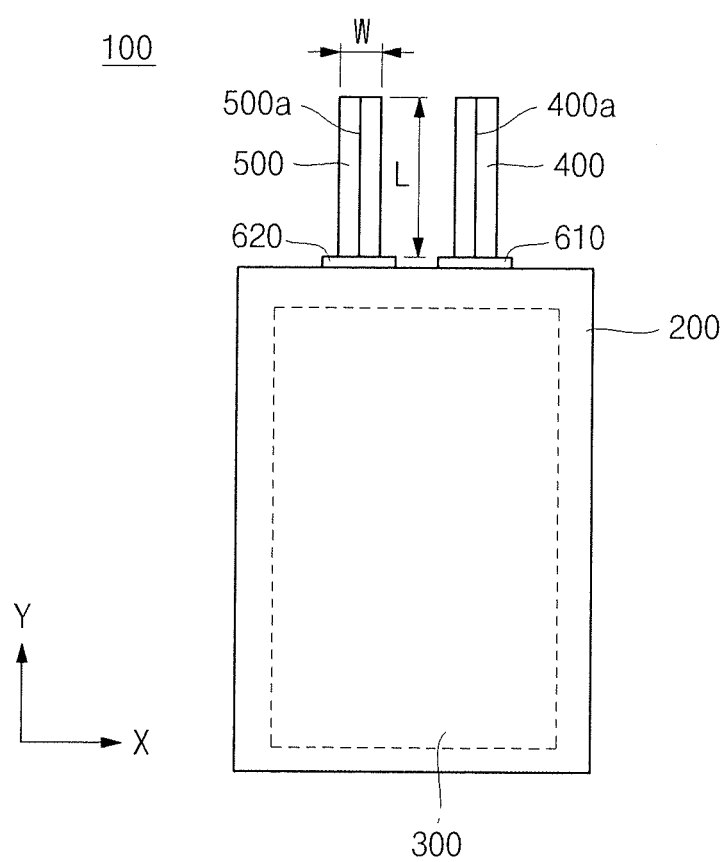
FIG. 2 is a front view of the secondary battery of FIG. 1.
Figure 3:
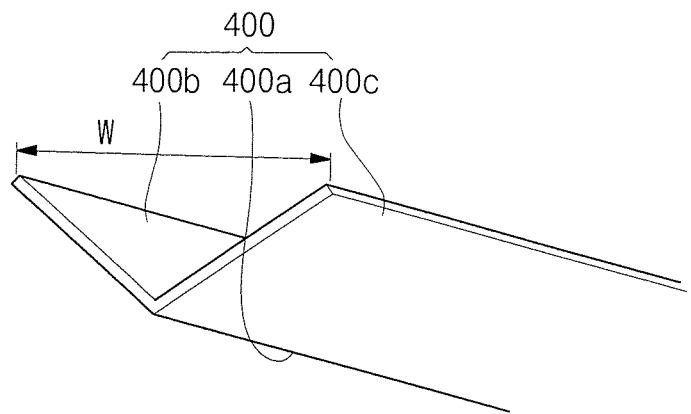
FIG. 3 is a perspective view of an electrode tab of the secondary battery of FIG. 1.

FIGS. 1 and 2 are an exploded perspective view and a front view of a secondary battery 100 according to an embodiment of the present invention. FIG. 3 is a perspective view of an electrode tab 400 according to the embodiment of the present invention.

Referring to FIGS. 1 to 3, the secondary battery 100 includes a pouch 200 and an electrode assembly 300 accommodated in the pouch 200.

The pouch 200 has an integrally formed substantially box-like shape and includes a first pouch portion 210 and a second pouch portion 200 that are foldable about a short edge thereof. A recess or cavity in which the electrode assembly 300 is accommodated is formed at a central portion of the first pouch portion 210 by pressing. The pouch 200 has a triple layer structure including a nylon layer, an aluminum thin film, and a polyolefin resin layer.

The electrode assembly 300 includes a first electrode plate 310, a second electrode plate 320, and a separator 330 interposed between the first electrode plate 310 and the second electrode plate 320. The first electrode plate 310, the second electrode plate 320, and the separator 330 are wound to form a jelly-roll configuration thereby. The electrode assembly 300 is sealed together with an electrolyte within the pouch 200.

The first electrode plate 310 is formed by coating a first electrode active material such as lithium oxide on opposite sides of a first electrode collector formed by a thin film such as aluminum foil. The second electrode plate 320 is formed by coating a second electrode active material such as carbon on opposite sides of a second electrode collector formed by a thin film such as copper foil.

A first electrode tab 400 is formed on one side of the first electrode plate 310 of the electrode assembly 300, and a second electrode tab 500 is formed on one side of the second electrode plate 320. The first electrode tab 400 and the second electrode tab 500 are disposed in parallel and are spaced from each other in the jelly-roll configuration. Some portions of the first electrode tab 400 and the second electrode tab 500 are exposed to the outside of the pouch 200 so that the first electrode tab 400 and the second electrode tab 500 can be electrically connected to a protection circuit module. The first electrode tab 400 and the second electrode tab 500 are generally made of a metal such as aluminum, copper, or nickel, and have high electrical conductivities to minimize voltage drops.

A first insulation tape 610 and a second insulation tape 620 are formed between the first electrode tab 400 and the pouch 200 and between the second electrode tab 500 and the pouch 200 respectively. The first insulation tape 610 and the second insulation tape 620 are attached to portions of the first electrode tab 400 and the second electrode tab 500 that make contact with the pouch 200 to prevent or reduce the likelihood of a short-circuit between the electrode tabs and the pouch 200. Hereinafter, it is assumed that the first electrode plate 310 and the first electrode tab 400 are the positive electrode and the second electrode plate 320 and the second electrode tab 500 is the negative electrode. In this case, the first electrode tab 400 is generally made of aluminum and the second electrode tab 500 is made of nickel. In FIG. 2, the X-direction and the Y-direction are the widthwise (W) and lengthwise (L) directions, respectively, of the first electrode tab 400 and the second electrode tab 500. Hereinafter, the first electrode tab 400 will be described for convenience' sake. But the second electrode tab 500 has substantially the same characteristics with the first electrode tab 400. It should be understood that electrode tabs refer to all of the first electrode tab and the second electrode tab.

The first electrode tab 400 has a bent structure whose widthwise cross-section is V-shaped. A bending line or crease 400a is formed at a central portion of the first electrode tab 400 along the lengthwise direction of the first electrode tab 400 by a jig or a press. A first side tab 400b and a second side tab 400c are bent and V-shaped about the crease 400a. The first side tab 400b and the second side tab 400c forms a specific angle that is less than 180°. The crease 400a may be oriented towards either the first pouch 210 or the second pouch 220.

A conventional electrode tab has a narrow width and a long length, and has a thickness of approximately 0.1 mm. Hence, the electrode tab may be deformed even by a very weak load. In addition, the electrode tab may be deformed even without an external force due to its structural characteristics. This increases the number of defective secondary batteries due to processes performed on the battery after electrode tabs are deformed or are not arranged in proper positions.

Strength generally relates to a maximum load or stress that can be applied to a member or a structure while maintaining the function of the member or the structure until the member or the structure is fractured, and is a natural value for measuring the properties of a material. Meanwhile, rigidity is a property by which a loaded structure or member resists deformation, and the values of rigidity are different according to the shape or support of the structure even in the case of the same material. Generally, as strength increases, rigidity also increases. Strength can be enhanced by an alloy, and rigidity can be enhanced through a modification of a structure as well as by an alloy.

Accordingly, in an embodiment of the present invention, the rigidity of the first electrode tab 400 can be increased by forming a crease 400a at a central region of the electrode tab 400 along the lengthwise (L) direction of the first electrode tab 400 and making the first electrode tab 400 V-shaped. If the first electrode tab 400 has the V-shaped bending structure, when an external load is applied to an upper portion, a front portion, and a rear portion of the first electrode tab 400, the first electrode tab 400 is not easily deformed as compared to a flat electrode tab. This is because the rigidity of the first electrode tab 400 is increased by the V-shaped structure of the first electrode tab 400.

Therefore, the fraction of defective secondary batteries can be reduced by minimizing deformation of the first electrode tab 400 due to external loads applied when the first electrode tab 400 is preliminarily charged and is welded to a terminal of a protection circuit module and when the secondary battery 100 is moved.

Figure 4:
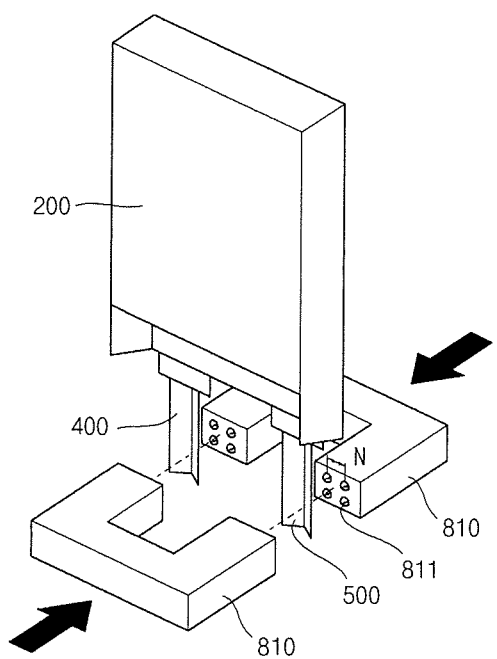
FIGS. 4 and 5 are perspective views of a secondary battery and pre-chargers according to an embodiment of the present invention.
Figure 5:
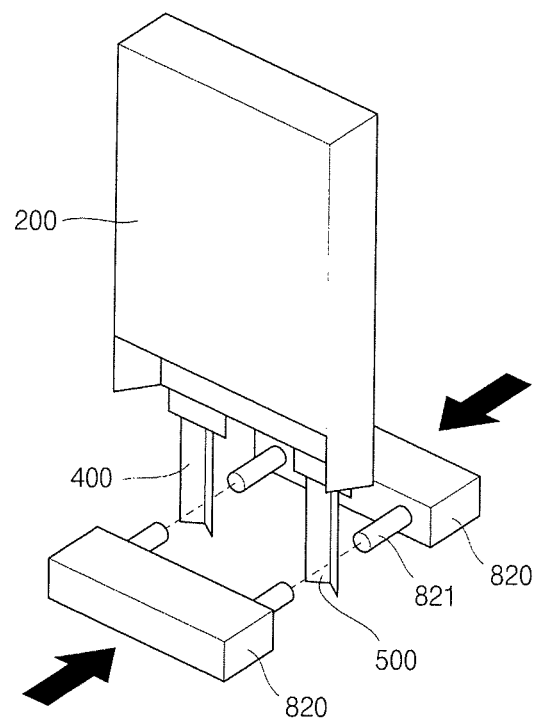

FIGS. 4 and 5 are perspective views of the secondary battery 100 and pre-chargers 810 and 820 according to an embodiment of the present invention. The pre-charger 810 of FIG. 4 has blocks at portions thereof that make contact with the electrode tabs 400 and 500, and the pre-charger 820 of FIG. 5 has pins at portions thereof that make contact with the electrode tabs 400 and 500.

Referring to FIGS. 4 and 5 together with FIG. 3, although the sizes of the electrode tabs 400 and 500 are different according to the capacity of the secondary battery 100, the widths thereof are generally from 4 to 6 mm or from 2 to 3 mm in the case of the secondary battery 100 of small capacity. Hence, if the electrode tabs 400 and 500 are deformed or deviated from proper positions before a pre-charging operation, the pre-chargers 810 and 820 and the electrode tabs 400 and 500 cannot make contact with each other, causing inferiority. In particular, since the pin type pre-charger 820 has small contact areas of the contact pins 821 with the electrode tabs 400 and 500, the electrode tabs 400 and 500 and the pre-charger 820 cannot make contact with each other when the electrode tabs 400 and 500 are normally arranged, causing inferiority.

However, the contact inferiority between the pre-chargers 810 and 820 and the electrode tabs 400 and 500 can be prevented or reduced by bending the electrode tabs 400 and 500 in V-shapes and minimizing deformation of the electrode tabs 400 and 500 in the processes when the pre-charger is operated.

In the example of the first electrode tab 400, the distance between an edge of the first side tab 400b and an adjacent edge of the second side tab 400c is more than 0.5 mm. In other words, the width W of the bent first electrode tab 400 is more than 0.5 mm. Four probe pins 811 are formed in portions of the block type pre-charger 810 that make contact with the first electrode tab 400, and the first electrode tab 400 needs to make contact with at least one of the four probe pins 811 to charge the secondary battery. Since the interval N between the two probe pins 811 located in a direction perpendicular to the length L of the first electrode tab 400 is 0.5 mm, the distance between an end of the first side tab 400b and an end of the second side tab 400c needs to be more than 0.5 mm to prevent contact errors of the first electrode tab 400 and the probe pins 811 in advance.

The electrode tabs 400 and 500 may also be deformed when contacted with the pre-chargers 810 and 820. In particular, since the block type pre-charger 810 has wider contact areas with the electrode tabs 400 and 500 than the pin type pre-charger 820, larger loads are transferred to the electrode tabs 400 and 500, deforming the electrode tabs 400 and 500 and deviating the electrode tabs 400 and 500 from their proper positions.

However, according to an embodiment of the present invention, since the electrode tabs 400 and 500 have V-shaped bending structures, deformation of the electrode tabs 400 and 500 can be minimized by allowing the electrode tabs 400 and 500 to support the pressure of the pre-charger during a pre-charging operation, and thus deformation of the electrode tabs 400 and 500 and deviation of the electrode tabs 400 and 500 from proper positions can be minimized during movement of the secondary battery 100 and before the welding operation of the protection circuit module.

Figure 6:
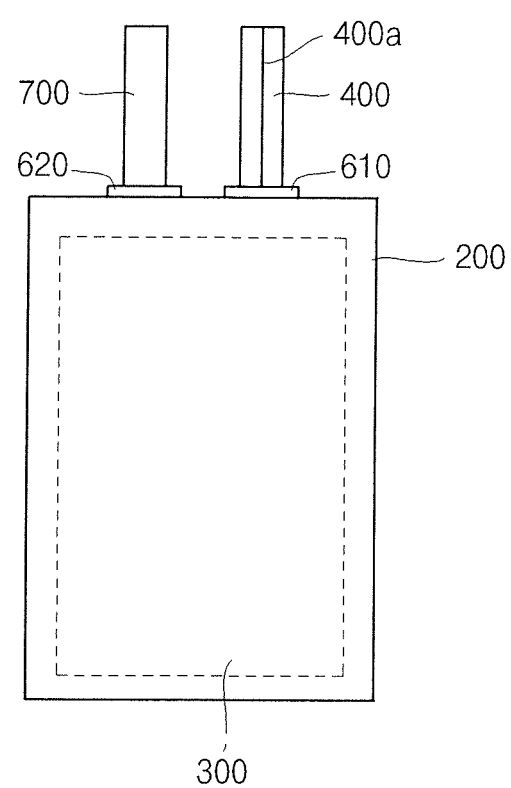
FIG. 6 is a front view of a secondary battery according to another embodiment of the present invention.

FIG. 6 is a front view of a secondary battery 100 according to another embodiment of the present invention.

Referring to FIG. 6, in the secondary battery 100 according to the embodiment of the present invention, only a first electrode tab 400 may be bent in a V-shape. The shape of the first electrode tab 400 of FIG. 6 is the same as that of the electrode tab 400 illustrated in FIGS. 1 to 5.

The first electrode tab 400 is a positive electrode tab, and may be made of the same material as that of a first electrode collector such as aluminum. Aluminum has high malleability and ductility as compared with the second electrode tab 400 made of nickel, but has low strength and rigidity.

Hence, the rigidity of the electrode tab 400 can be increased by forming a crease 400a at a central portion of the first electrode tab 400 along the lengthwise direction of the first electrode tab 400 only, and the second electrode tab 700 has no bending line.

Although not illustrated, only the second electrode tab may have a V-shape. However, the present invention is not limited by which electrode tab has a bent V-shape.

FIGS. 7 to 13 are sectional views of electrode tabs 405, 410, 415, 420, 425, 430, and 435 according to other embodiments of the present invention. In FIGS. 7 to 13, the sectional views are taken along the widthwise directions of the electrode tabs. The electrode tabs of FIGS. 7 to 13 are different from the first electrode tab 400 of FIGS. 1 to 5 only in the widthwise cross-sections, but the basic object and other descriptions of preventing deformation of the electrode tabs due to an external load and deviation of the electrode tabs from proper positions are the same as the electrode tab of FIGS. 1 to 6. It should be understood that the widthwise structures of the electrode tabs of FIGS. 7 to 13 may be the same over the overall lengthwise direction, but they may also be formed at only specific portions of the lengths of the electrode tabs. Hereinafter, first electrode tabs will be described for convenience' sake.

Figure 7:
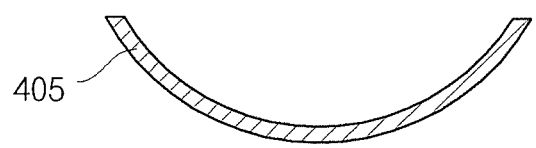
FIGS. 7 to 13 are sectional views of electrode tabs of the secondary battery according to other embodiments of the present invention.

Referring to FIG. 7, the widthwise cross-section of the first electrode tab 405 according to the embodiment of the present invention has a specific curvature that is constant along the widthwise direction of the first electrode tab 405.

Since the curvature of the first electrode tab 405 is constant, deformation of the first electrode tab 405 can be minimized by uniformly distributing an external load.

Figure 8:
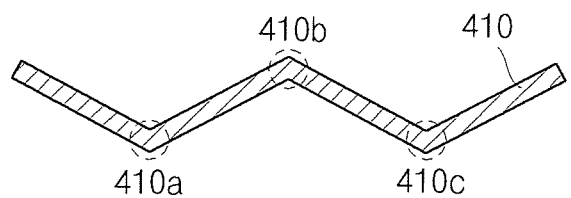

Referring to FIG. 8, the widthwise cross-section of the first electrode tab 410 according to the embodiment of the present invention has three creases 410a, 410b, and 410c along the lengthwise direction of the first electrode tab. Hence, the first electrode tab 410 has a W-shaped widthwise cross-section by the existence of the creases 410a, 410b, and 410c.

Since the first electrode tab 410 is bent twice more as compared to the first electrode tab 400 of FIGS. 1 to 5, deformation of the first electrode tab 410 due to an external load can be substantially prevented.

Figure 9:
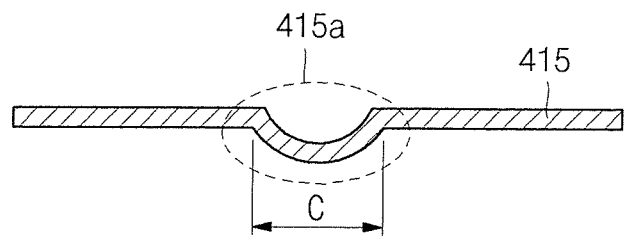
Figure 10:
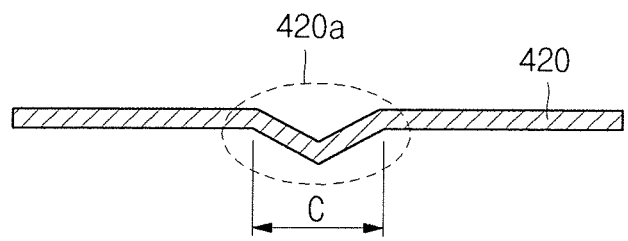
Figure 11:
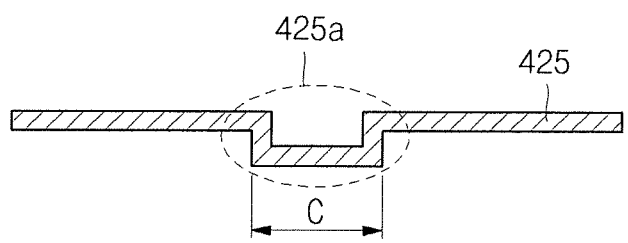

Referring to FIGS. 9 to 11, in the widthwise cross-sections of the first electrode tabs 415, 420, and 425 according to the embodiments of the present invention, protrusions 415a, 420a, and 425a are formed at widthwise central portions C of the first electrode tabs 415, 420, and 425. The protrusions 415a, 420a, and 425a are machined at central portions of the first electrode tabs 415, 420, and 425 along the lengthwise directions of the first electrode tabs 415, 420, and 425 by a jig or a press. The widthwise cross-sections of the protrusions 415a, 420a, and 425a have an arc shape, a rectangular shape, and a triangular shape. In one embodiment, the shapes of a jig or a press for forming the protrusions 415a, 420a, and 425a are the same as those of the protrusions 415a, 420a, and 425a.

The deformation of the first electrode taps 415, 420, and 425 can be minimized when the first electrode taps 415, 420, and 425 receive the external loads because the protrusions 415a, 420a, and 425a can increase the rigidity of the first electrode tabs 415, 420, and 425.

Figure 12:
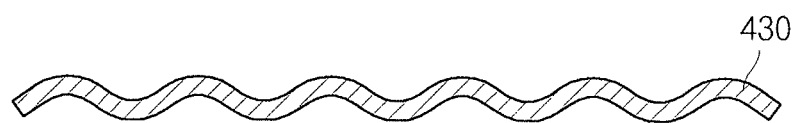
Figure 13:
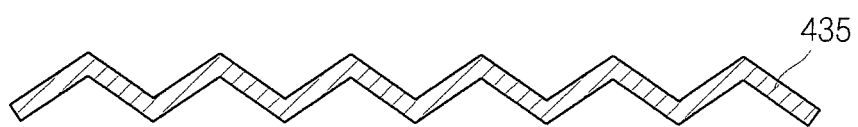

Referring to FIGS. 12 and 13, the widthwise cross-sections of first electrode tabs 430 and 435 according to the embodiments of the present invention have wavy or zigzag shapes. The first electrode tab 430 of FIG. 12 has a wavy or zigzag shape having a curvature, and the first electrode tab 435 of FIG. 13 has a wavy or zigzag shape whose bent portions have a specific angle. In FIGS. 12 and 13, the wavy or zigzag shapes of the first electrode tabs 430 and 435 are regularly formed, but may also be irregularly formed.

The deformation of the first electrode taps 430 and 435 can be minimized when the first electrode tap 430 and 435 receive the external loads because the wavy or zigzag shapes can increase the rigidity of the first electrode tabs 430, and 435.

Figure 14:
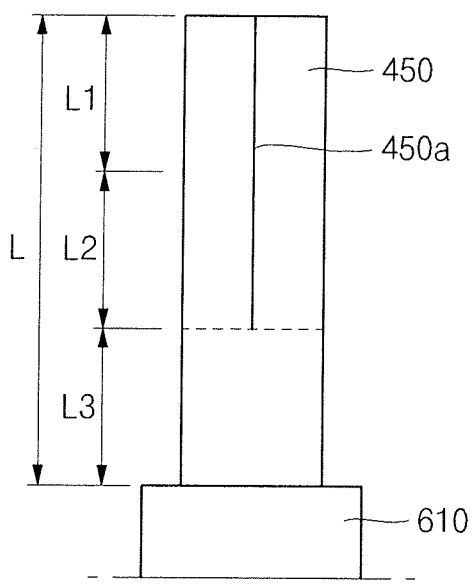
FIGS. 14 to 16 are front views of electrode tabs of the secondary battery according to other embodiments of the present invention.
Figure 15:
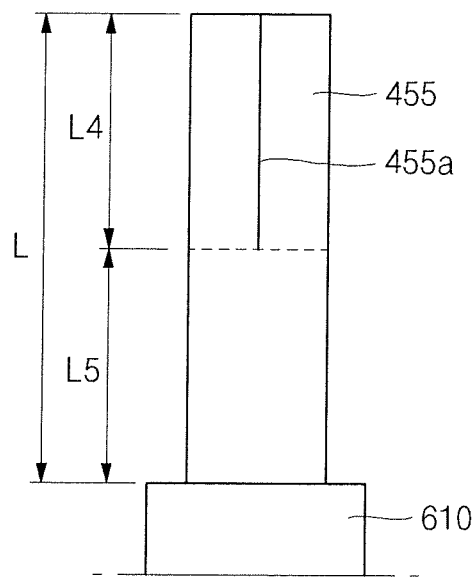
Figure 16:
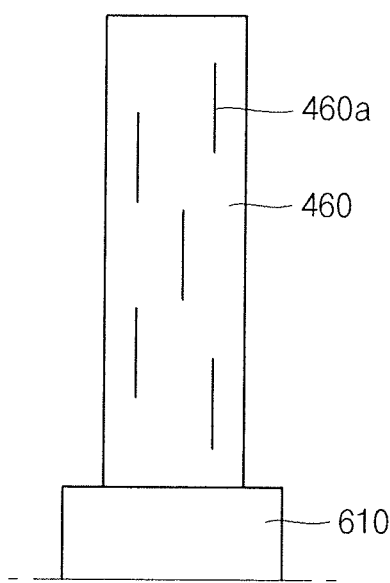

FIGS. 14 to 16 are front views of electrode tabs 450, 455, and 460 according to other embodiments of the present invention. The electrode tabs of FIGS. 14 to 16 are different from the first electrode tabs 400 and 500 of FIGS. 1 to 5 only in the positions of the creases and the lengths of the creases, but the basic object and other descriptions of preventing deformation of the electrode tabs due to an external load and deviation of the electrode tabs from proper positions are the same as the electrode tab of FIGS. 1 to 6. It should be understood that the electrode tabs of FIGS. 14 to 16 may have the widthwise cross-sections as shown in FIGS. 7 to 13 instead of the V-shapes. Hereinafter, first electrode tabs will be described for convenience sake.

Referring to FIG. 14, the length of the first electrode tab 450 according to the embodiment of the present invention is classified into an upper region L1, a central region L2, and a lower region L3 of the first electrode tab 450. The upper region L1 of the first electrode tab 450 is from the top end of the first electrode tab 450 to a position one third from the top end of the first electrode tab 450. The central region L2 of the first electrode tab 450 is from a position one third from the top end of the first electrode tab 450 to two thirds from the top end of the first electrode tab 450. The lower region L3 of the first electrode tab 450 is from a position two thirds from the top end of the first electrode tab 450 to the top end of an insulation tape 610.

The crease 450a and the V shape of the first electrode tab 450 are formed at the upper region L1 and the central region L2 of the first electrode tab 450. The portion of the first electrode tab 450 below the lower region L3 is supported by the pouch and the insulation tape 610. Hence, since the pouch and the insulation tape 610 support some portions of the first electrode tab 450 that are not exposed from the insulation tape 610 to the outside, the lower region L3 of the first electrode tab 450 can maintain its rigidity even without a crease and a V-shaped bending structure.

Referring to FIG. 15, the length of a first electrode tab 455 according to the embodiment of the present invention is classified into an upper region L4 and a lower region L5. The upper region L4 of the first electrode tab 455 is from the top end of the first electrode tab 455 to a position halfway from the top end of the first electrode tab 455 and the lower region L5 of the first electrode tab 455 is from a position halfway from the top end of the first electrode tab 455 to the top end of an insulation tape 610.

A crease 455a and a V-shaped structure are formed in the upper region L4 of the first electrode tab 455. The portion of the first electrode tab 455 below the lower region L5 is supported by the pouch and the insulation tape 610. Hence, since the pouch and the insulation tape 610 support some portions of the first electrode tab 455 that are not exposed from the insulation tape 610 to the outside, the lower region L5 of the first electrode tab 455 can maintain its rigidity even without a bending line and a V-shaped bending structure.

Referring to FIG. 16, in a first electrode tab 460 according to another embodiment of the present invention, creases 460a and V-shaped structures are located at random. The positions, sizes, shapes of the crease 460a and the V-shaped structures are not particularly limited as long as the electrode tab 460 is able to maintain its rigidity.

Figure 17A:
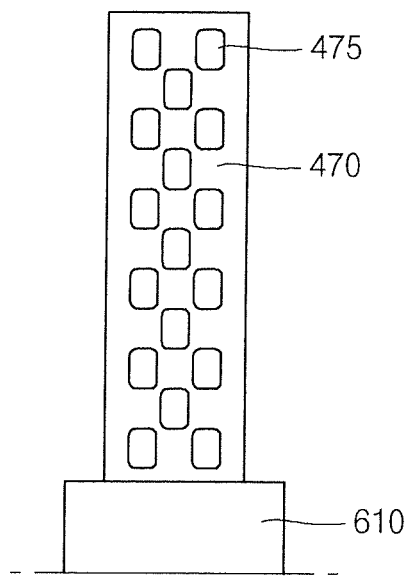
FIGS. 17a to 17b are a plan view and a sectional view of a further embodiment of an electrode tab in accordance with the invention.
Figure 17B:
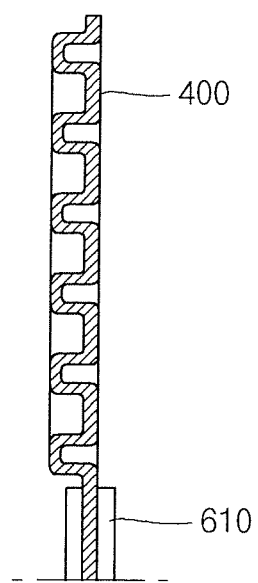

FIGS. 17a and 17b show a plan view and a lengthwise sectional view of a first electrode tab 470 according to a further embodiment of the invention.

In this embodiment, the electrode tab 470 is non-planar, as in the previous embodiments. However, in this case, simple bend lines are not used. Instead, the electrode tab 470 comprises a series of generally rectangular recesses 475. These recesses 475 provide rigidity to the tab 470 in a similar manner to the bends of the previous embodiments.

It will seem that the recesses 475 are generally rectangular in their shape, but many other shapes are equally suitable. Furthermore, although the recesses are arranged in three columns and eleven rows in this embodiment, it is important to understand that more or fewer rows or columns can be included.

Figure 18A:
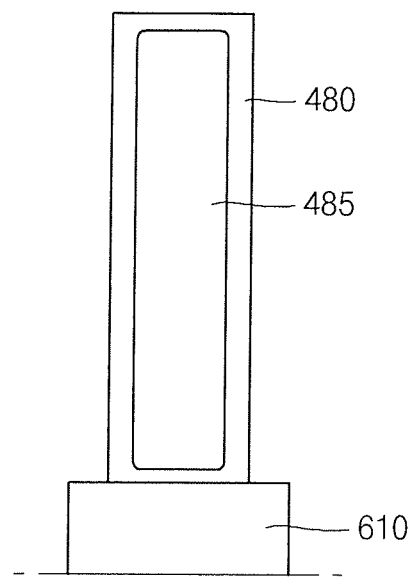
FIGS. 18a and 18b are a plan view and a sectional view of a further embodiment of an electrode tab in accordance with the invention.
Figure 18B:
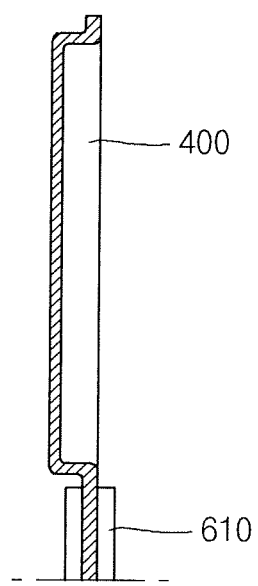

FIGS. 18a and 18b are a plan view and a sectional view of a further embodiment of an electrode tab 480 in accordance with the invention. In this case, the electrode tab 480 includes a single rectangular recess 485. The recess 485 in parts increased rigidity to the electrode tab 480 in a similar manner to previous embodiments. It will be noted that this electrode tab is, once again, non-planar. Although the recess is generally rectangular, many other shapes can be used for the recess.

Figure 19:
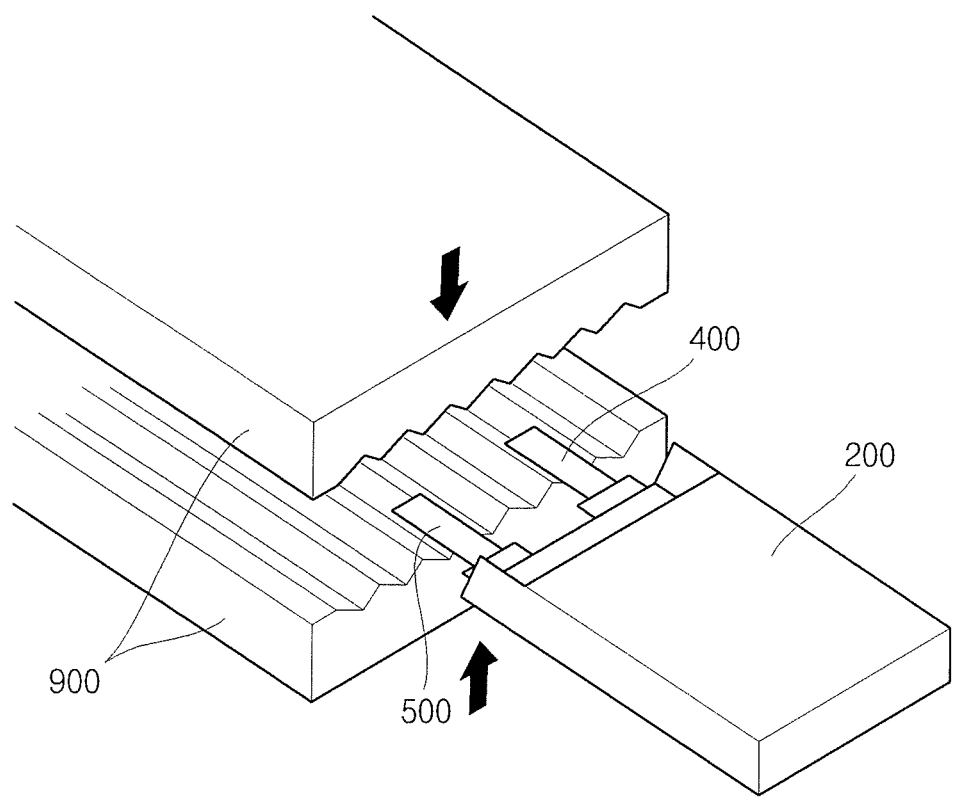
FIG. 19 is a perspective view illustrating a method of bending electrode tabs of the secondary battery according to an embodiment of the present invention.

FIG. 19 is a perspective view illustrating a method of bending electrode tabs 400 and 500 according to an embodiment of the present invention.

Referring to FIG. 19, after an electrode assembly 300 is sealed by a pouch 200, portions of the electrode assembly 300 that protrude to the outside of the pouch 200 are pressed by a jig or press 900. In the embodiment of the present invention, the jig or press 900 has a saw-toothed shape to make the electrode tabs 400 and 500 V-shaped. However, it is apparent that the shapes of the electrode tabs of FIGS. 7 to 13 may be formed by manufacturing the jig or press that corresponds to those shapes.

The bent electrode tabs 400 and 500 may be flattened when they are pressed by a welding jig during their coupling to a terminal of a protection circuit module.

The bending structures of the electrode tabs according to the above-mentioned embodiments of the present invention increase the rigidities of the electrode tabs, minimizing deformation of the electrode tabs and deviation of the electrode tabs from their proper positions. Accordingly, the number of defective secondary batteries can be reduced by locating electrode tabs at proper positions during pre-charging operations of the electrode tabs and welding of the electrode tabs to protection circuit modules.

Although the embodiments of the present invention have been described in detail hereinabove, it should be understood that many variations and modifications of the basic inventive concept herein described will still fall within the spirit and scope of the present invention as defined in the appended claims.

What is claimed:

1. A secondary battery comprising:
    a pouch;
    an electrode assembly in the pouch, the electrode assembly comprising a first electrode plate, a second electrode plate and a separator between the first electrode plate and the second electrode plate;
    a first electrode tab and a second electrode tab extending from the electrode assembly, wherein a first portion of at least one of the first electrode tab or the second electrode tab protruding from the pouch is non-planar along its length and a second portion of the at least one of the first electrode tab or the second electrode tab protruding from the pouch is planar along its length and contacts the pouch;
    a first insulation tape and a second insulation tape between the first electrode tab and the pouch and between the second electrode tab and the pouch, respectively,
    wherein the first portion is farther from the pouch and a corresponding insulation tape of the first and second insulation tapes than the second portion,
    wherein the second portion directly contacts the corresponding insulation tape of the first and second insulation tapes, and
    wherein the first portion is formed from one-half to two-thirds of the length from a distal end of the first and second electrode tab, respectively.

2. The secondary battery of claim 1, wherein at least one of the first electrode tab or the second electrode tab has at least one crease extending along its length.

3. The secondary battery of claim 1, wherein the first portion is substantially V-shaped, substantially W-shaped or substantially C-shaped.

4. The secondary battery of claim 1, wherein the first portion includes an arc.

5. The secondary battery of claim 1, wherein the first portion includes a plurality of peaks and valleys.

6. The secondary battery of claim 1, wherein the first portion is generally sinusoidal.

7. The secondary battery of claim 1, wherein a width of the first electrode tab and a width of the second electrode tab is between about 2 mm and about 6 mm.

8. The secondary battery of claim 1, wherein a portion of both the first electrode tab and the second electrode tab protruding from the pouch is non-planar along its length.

9. The secondary battery of claim 1, wherein at least one of the first electrode tab or the second electrode tab has at least one recessed portion.

10. The secondary battery of claim 9, wherein the at least one recessed portion comprises a plurality of dimples.

11. The secondary battery of claim 10, wherein the plurality of dimples are located throughout a whole area of the portion of the at least one of the first electrode tab or the second electrode tab external to the pouch.

* * * * *